Figure 1:
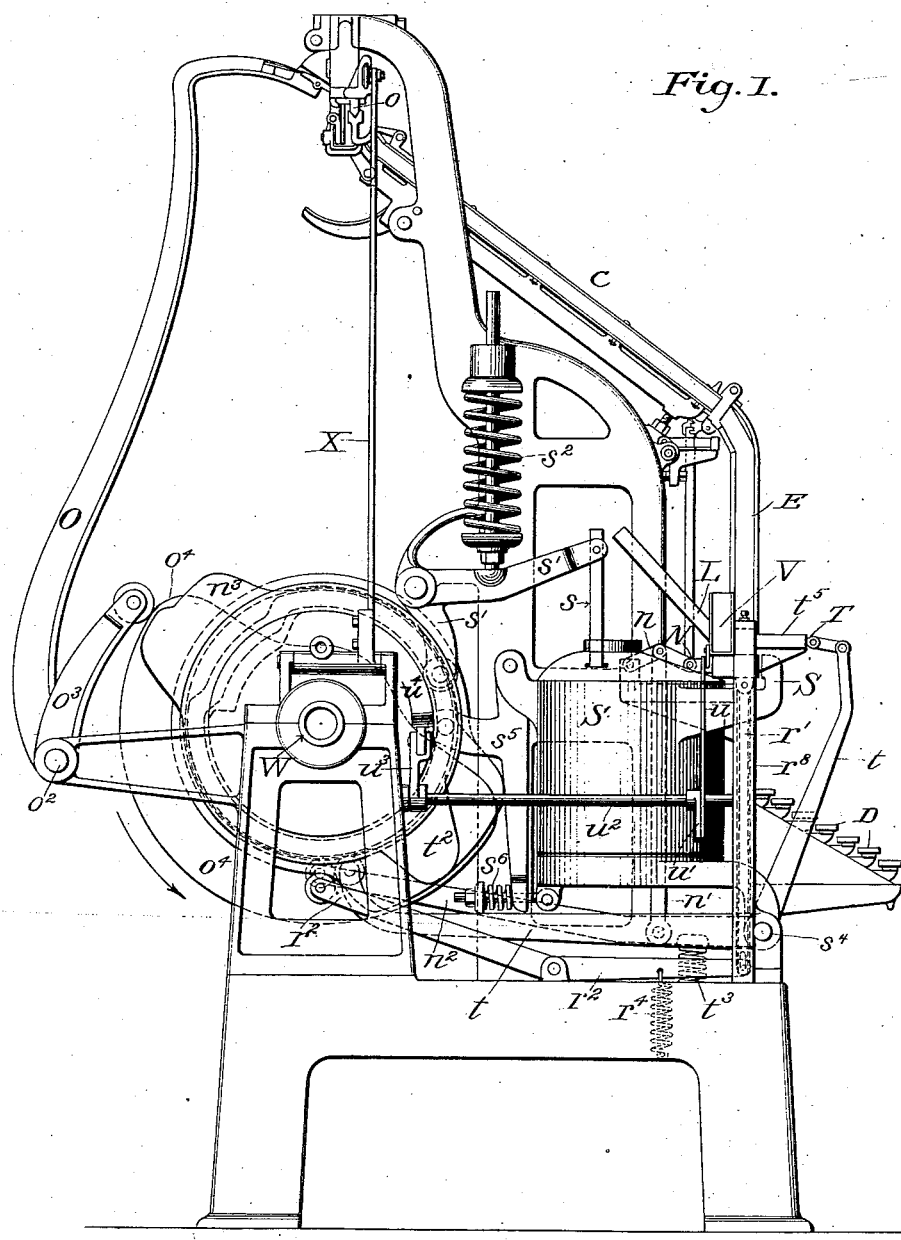

No. 618,044. Patented Jan. 17, 1899.
P. T. DODGE.
LINOTYPE MACHINE.
(Application filed June 29, 1893.)
(No Model.) 9 Sheets—Sheet 1.

Witnesses
Raymond A. Barnes.
F. S. Elmor.

Inventor
Philip T. Dodge

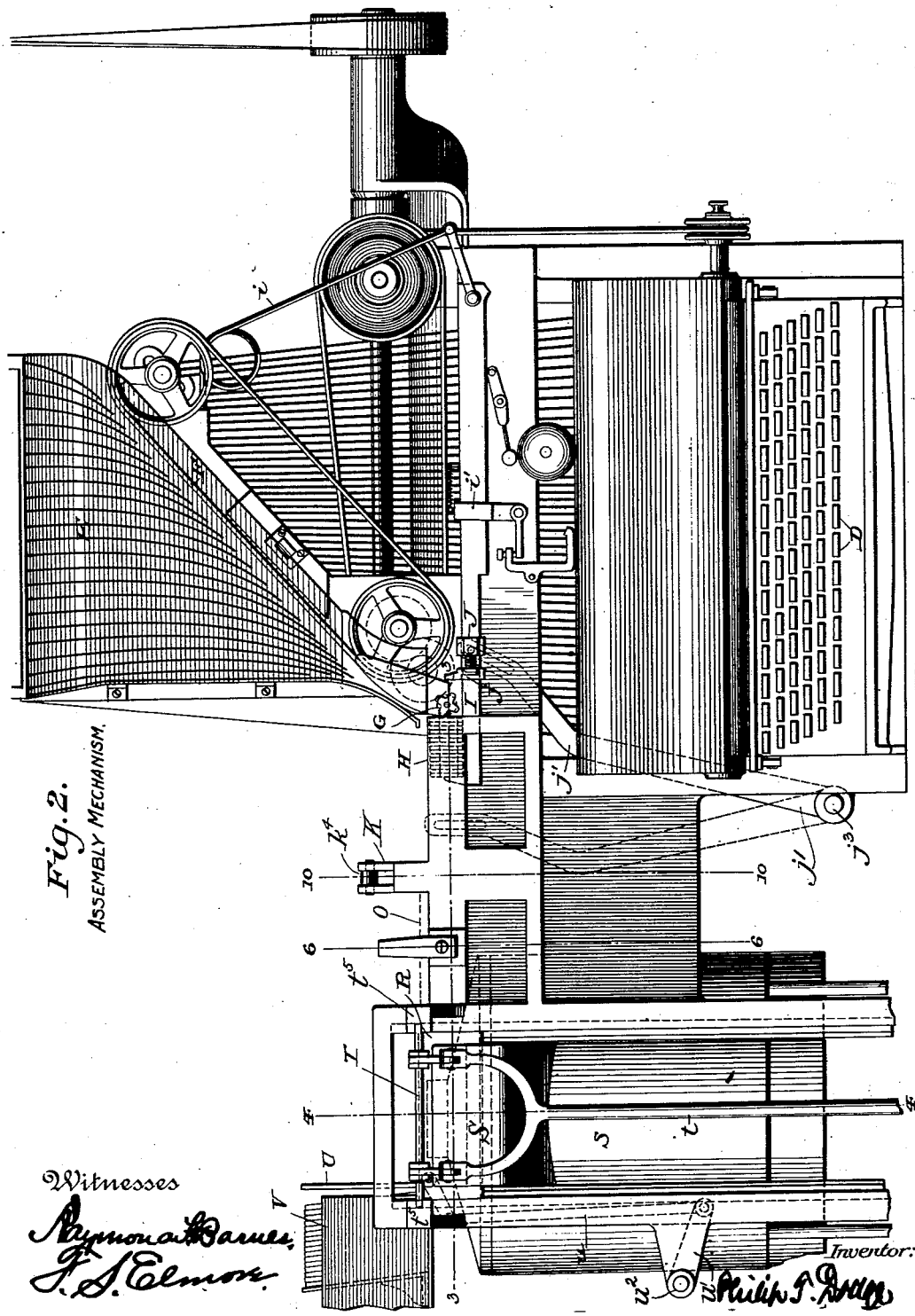

No. 618,044. Patented Jan. 17, 1899.
P. T. DODGE.
LINOTYPE MACHINE.
(Application filed June 29, 1893.)
(No Model.) 9 Sheets—Sheet 3.
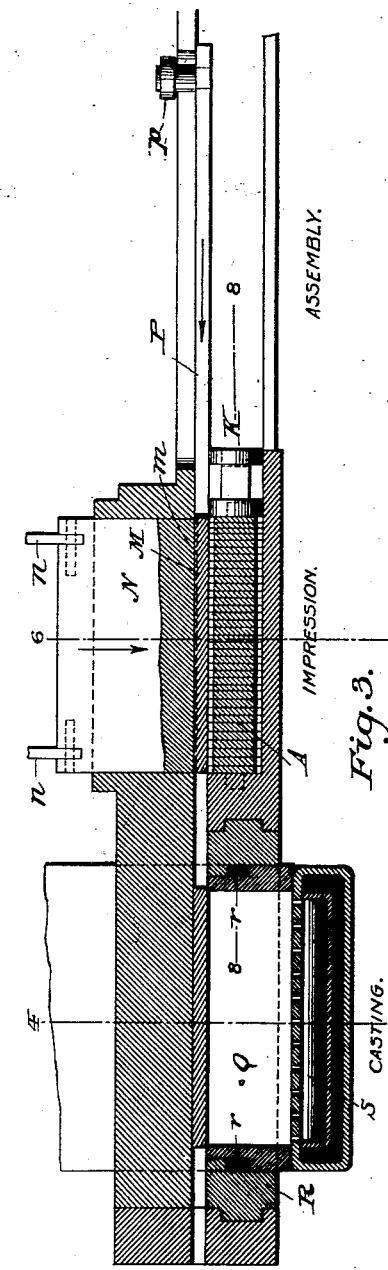
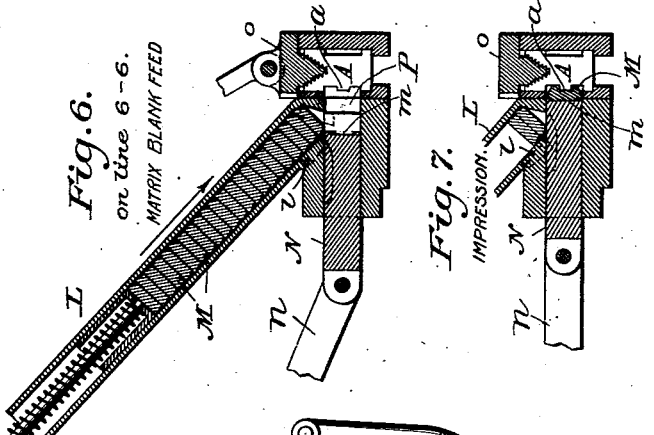
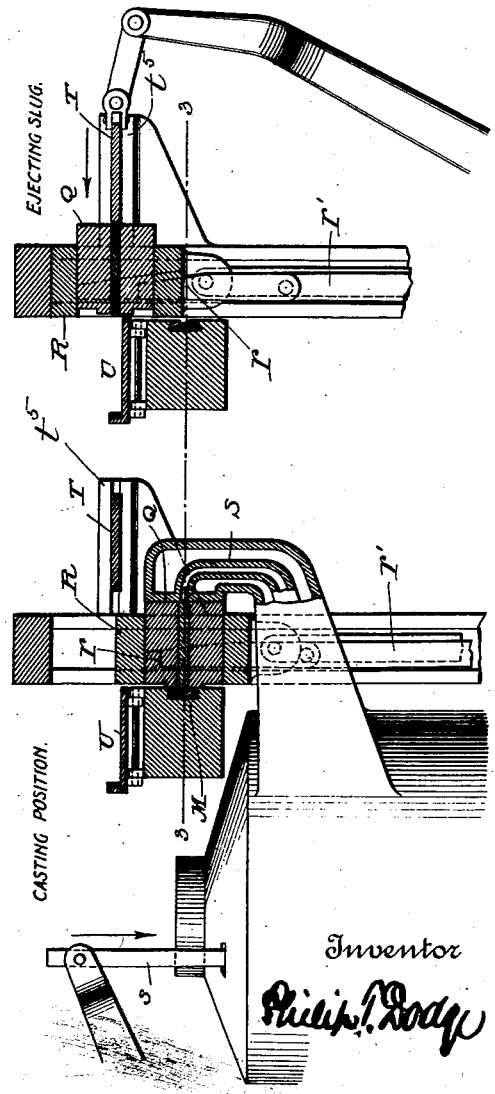
Witnesses
Raymond F. Barnes.
F. S. Elmor.
Inventor
Philip T. Dodge No. 618,044. Patented Jan. 17, 1899.
P. T. DODGE.
LINOTYPE MACHINE.
(Application filed June 29, 1893.)
(No Model.) 9 Sheets—Sheet 4.
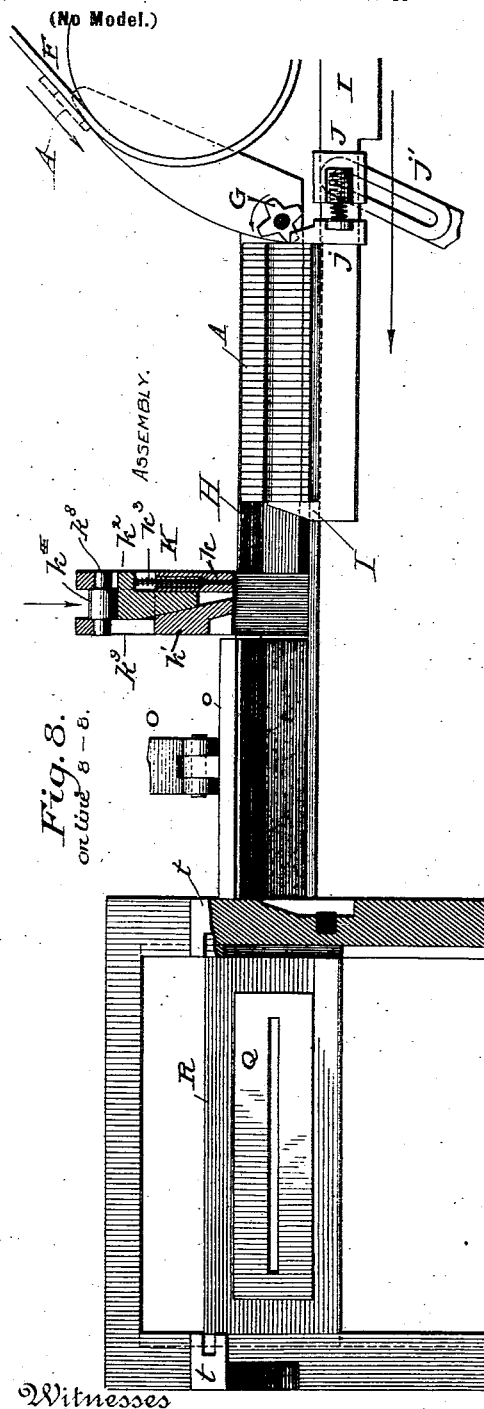
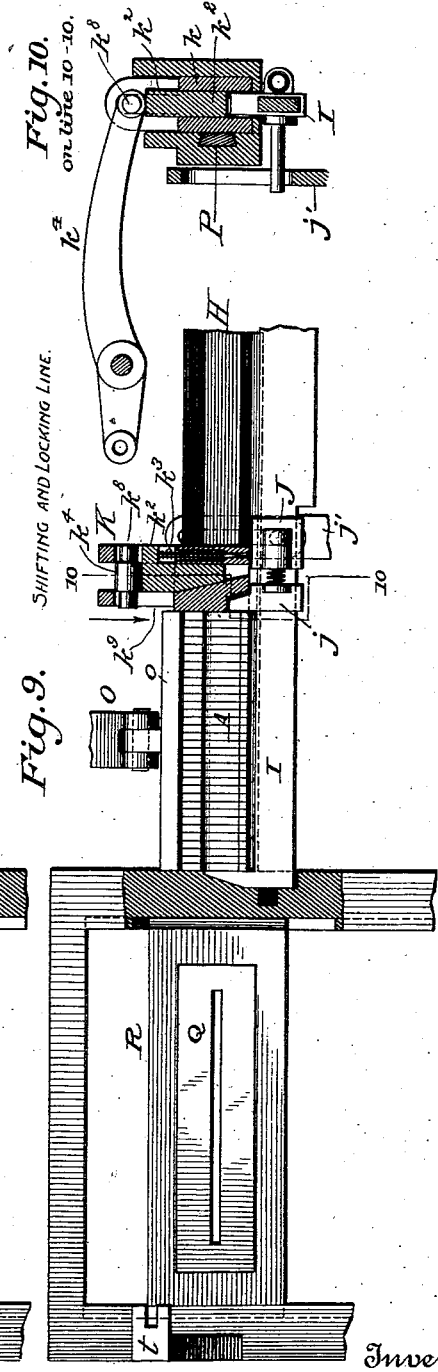
Witnesses
Inventor No. 618,044. Patented Jan. 17, 1899.
P. T. DODGE.
LINOTYPE MACHINE.
(Application filed June 29, 1893.)

(No Model.) 9 Sheets—Sheet 5.

Witnesses
Raymour F. Barnes.
F. A. Elmore.

Inventor
Philip T. Dodge

No. 618,044. Patented Jan. 17, 1899.
P. T. DODGE.
LINOTYPE MACHINE.
(Application filed June 29, 1893.)
(No Model.) 9 Sheets—Sheet 6.
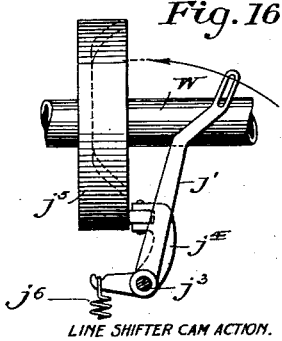
Fig. 16.
LINE SHIFTER CAM ACTION.
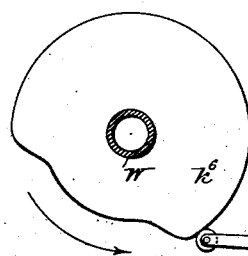
Fig. 17.
LINE LOCKING CAM ACTION.
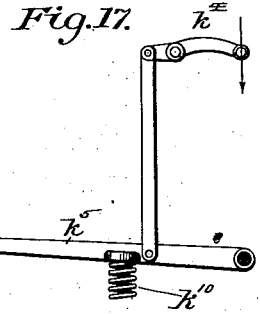
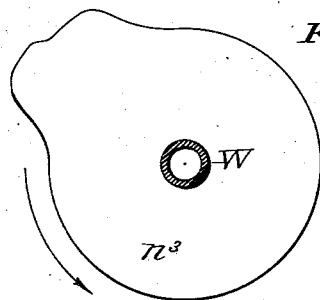
Fig. 18.
IMPRESSION CAM ACTION.
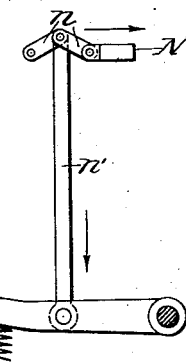
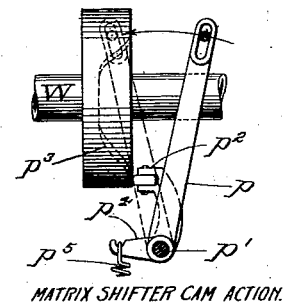
Fig. 19.
MATRIX SHIFTER CAM ACTION.
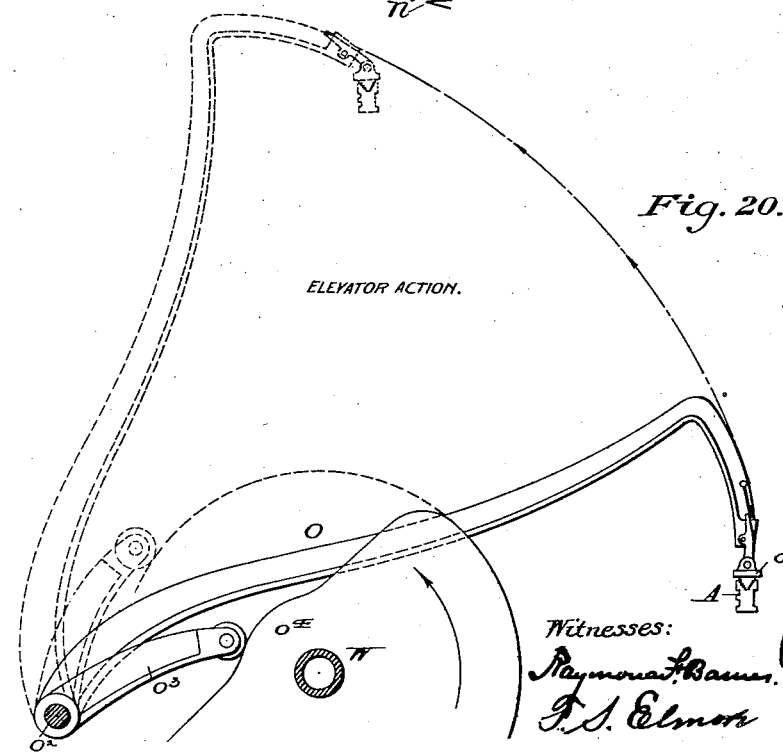
Fig. 20.
ELEVATOR ACTION.
Witnesses:
Raymond F. Barnes
F. S. Elmore
Inventor
Philip T. Dodge No. 618,044. Patented Jan. 17, 1899.
P. T. DODGE.
LINOTYPE MACHINE.
(Application filed June 29, 1893.)
(No Model.) 9 Sheets—Sheet 7.

POT AND PUMP CAM ACTION.

MOLD UNLOCKING AND LIFTING CAM ACTION.

EJECTOR CAM ACTION.

Witnesses
Raymond F. Barnes.
Fabius S. Elmore.

Inventor
Philip T. Dodge

No. 618,044.  
P. T. DODGE.  
LINOTYPE MACHINE.  
(Application filed June 29, 1893.)
Patented Jan. 17, 1899.
(No Model.)
9 Sheets—Sheet 8.
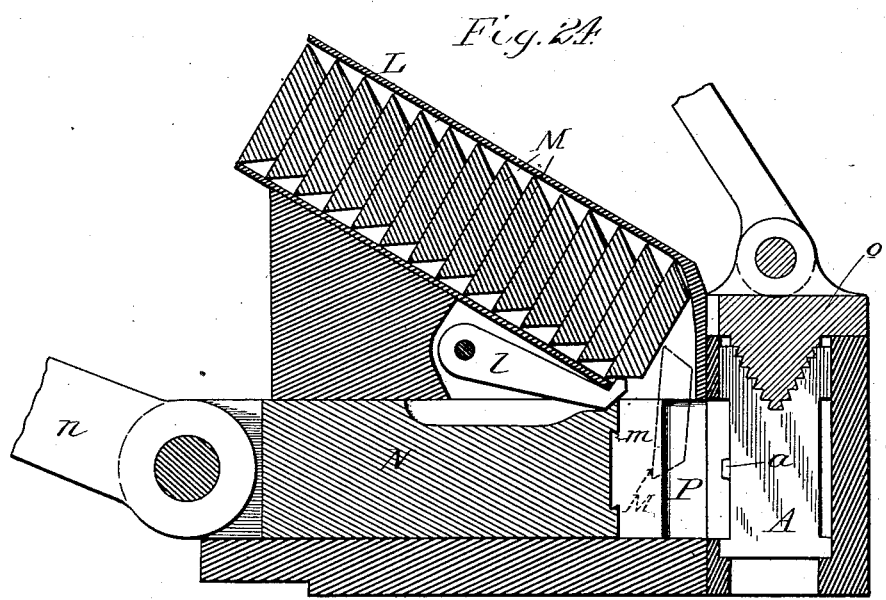
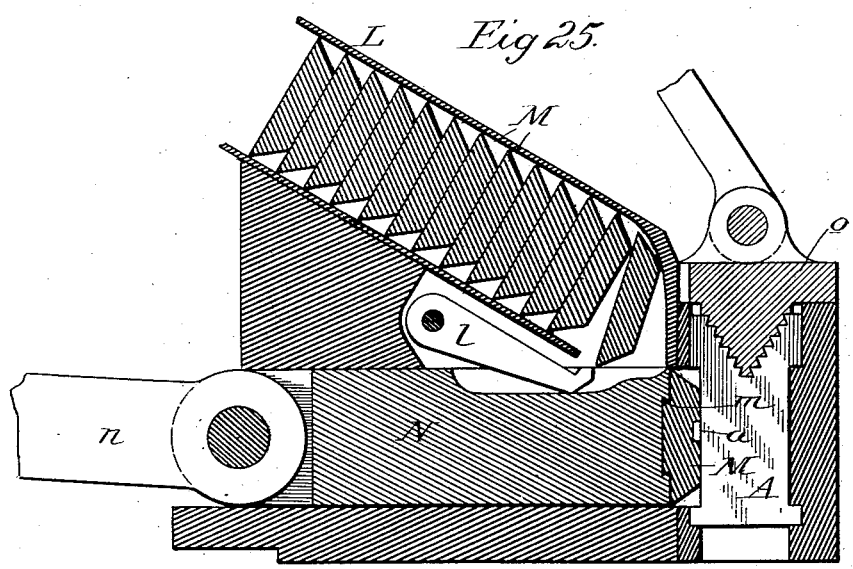
WITNESSES  
INVENTOR:

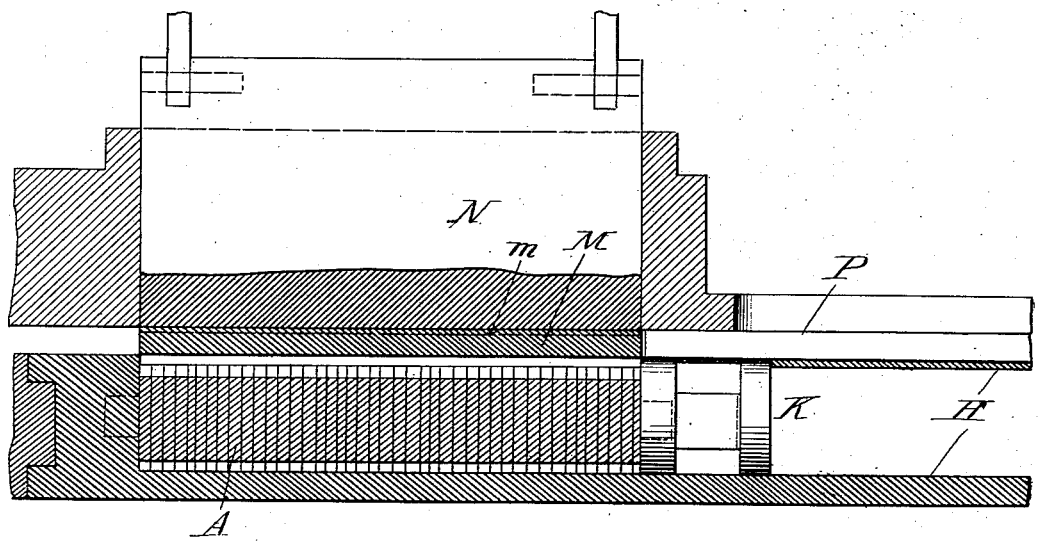

UNITED STATES PATENT OFFICE.

PHILIP T. DODGE, OF WASHINGTON, DISTRICT OF COLUMBIA.

LINOTYPE-MACHINE.

SPECIFICATION forming part of Letters Patent No. 618,044, dated January 17, 1899.

Application filed June 29, 1893. Serial No. 479,153. (No model.)

*To all whom it may concern:*

Be it known that I, PHILIP TELL DODGE, a citizen of the United States, residing in the city of Washington, in the District of Columbia, have invented certain new and useful Improvements in Linotype-Machines, of which the following is a specification, reference being had to the accompanying drawings, forming a part thereof.

My invention relates to a machine controlled by finger-keys and adapted to produce automatically linotypes or printing-slugs of type-metal each bearing on the edge in relief and properly spaced or justified the characters to print an entire line or one or more words or other matter.

The linotypes produced in my machine are essentially the same as those heretofore produced by the Mergenthaler linotype-machine, the Rogers typographic machine, and the machines patented by Lee and LeBrun, hereinafter referred to, and are not in themselves claimed as any part of my invention.

Heretofore these linotypes have been produced by machines of two classes. Machines of the first class, known as "direct-casting" machines and of which some thousands are in use, are well represented by the Mergenthaler patent, No. 437,532, dated September 16, 1890, and the patent of J. R. Rogers, No. 437,139, dated September 23, 1890. In these machines brass matrices or dies each containing a female character are selected and assembled, temporarily, in line and presented against a slotted mold, into which molten type-metal is delivered to form the slug or linotype, on which the type characters are produced in relief at the same operation by the matrices at the front, the matrices being subsequently distributed or returned to the magazine or storage-chamber. In the second class of machines, known as "impression-machines," to which the present invention relates, male type-dies each representing one letter or character are used in place of the female dies above referred to. These male dies are selected and assembled in line in the required order, and the line is then impressed into lead, papier-mâché, or equivalent material and immediately withdrawn. The result of the impression is a matrix adapted to produce the type characters for one line of print. The matrix thus produced is applied to close the face of a slotted mold into which type-metal is delivered to produce the slug or linotype on which the type characters are formed by the matrix, which, having answered its purpose, may be remelted and used for the formation of subsequent matrices.

The distinction between the two classes of machines lies in the fact that in the one case each line-matrix is composed of a series of permanent hard-metal single-letter matrices temporarily brought together and subsequently distributed for further use, while in the second class of machines the matrix is of a temporary character, being produced by the impression of the assembled dies and being destroyed or sent to waste after it is used. Machines of this second or impression class are well represented in Letters Patent to Lee and LeBrun, No. 447,134, dated February 24, 1891, and in patent of the same date to Homer Lee, No. 447,135.

In the Lee and LeBrun machine and in other impression-machines heretofore known it was necessary to complete the impression from the assembled dies and to redistribute the dies to their points of storage before the dies for a second line could be composed or assembled. In short, practically all the operations attending the production of one linotype had to be completed before the first step could be taken toward the production of a second linotype.

It is the principal object of my invention to increase the speed of machines of the impression type by so constructing and arranging the parts that the dies for one line may be composed while the dies for the preceding line are in progress to the magazine or place of storage.

To this end my invention consists, broadly, in the combination of dies or punches representing individual characters, a composing mechanism by which the required dies may be selected and assembled in line, together with suitable spacers, an impression mechanism by which the assembled or composed line of dies is impressed into lead, paper-mâché, or other suitable material to produce a type-line matrix, casting mechanism by which the linotypes or slugs are cast against the successive matrices produced as above mentioned, and a distributing mechanism by which the dies are restored to the magazine or holder after each impression, this distributing mechanism being "distinct," "independent," or "separate" from the composing or assembling mechanism, by which terms I mean that the distribution of one line may be carried on during the composition of another.

The machine includes also as subordinate features certain means for automatically feeding the blank-strips to the impression mechanism and means for delivering them from the impression mechanism to the casting mechanism.

It is to be distinctly understood that the dies may be varied in form and arranged in combination with composing and distributing mechanisms of any suitable character and that the impression and casting mechanisms may be modified in their details of construction.

In some cases and for special purposes I propose to omit the casting mechanism and to use the remainder of the machine simply for the purpose of producing the line-matrices, these matrices being adapted for use with independent casting mechanisms already known in the art and forming no part of my invention—such, for example, as the typograph casting mechanism—making use of leaden matrices and used in numerous printing-offices in the United States.

In order to secure a high rate of speed and permit the different operations to be carried on concurrently, I arrange my punches or dies to circulate within the machine, so that they leave the magazine or place of storage at one point and return to it at another, thus allowing the assemblage of one line of dies, the distribution of another, and the casting from the matrix to be carried on at the same time.

I prefer to make use as far as possible of an organization of parts similar to that of the well-known Mergenthaler linotype represented in Letters Patent No. 436,532.

In the machine represented in the accompanying drawings the keyboard, the magazine, and the assembling and distributing mechanisms are all of essentially the same construction as those in the patent above referred to.

Figure 12:
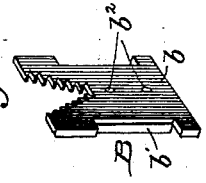
Figure 11:
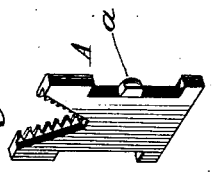
Figure 13:
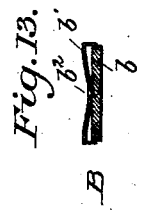
Figure 15:
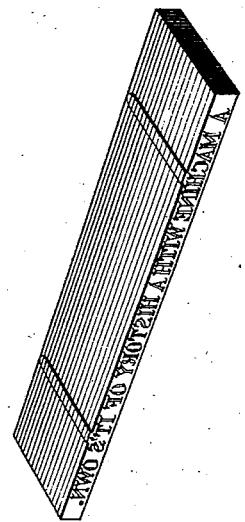
Figure 14:
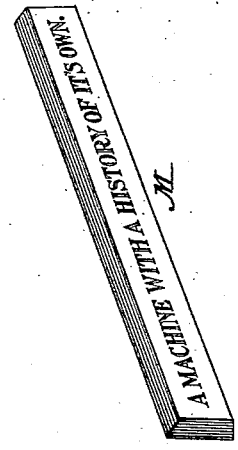

Figure 1 is an end elevation of my machine. Fig. 2 is a front elevation of the composing, impressing, and casting mechanisms. Fig. 3 is a horizontal section on the line 3 3 of Figs. 2, 4, and 5, the part K being shown in plan. Fig. 4 is a vertical cross-section through the casting mechanism from front to rear on the line 4 4 of Figs. 2 and 3 with the parts in the position for casting. Fig. 5 is a view of the same part in the act of ejecting the linotype after the casting operation, the mold-retracting wedges being shown in their lowered position and out of contact with their bearing-faces upon the mold. Fig. 6 is a vertical cross-section from front to rear on the line 6 6 of Figs. 2 and 3, illustrating the manner in which the matrix-blanks are automatically fed to the indenting or impression mechanism. Fig. 7 is a similar view of the parts during the indenting action. Fig. 8 is a front elevation, partly in section, on the line 8 8 of Fig. 3, showing the construction of the mechanism for composing the line of dies and transferring the same to the indenting mechanism, the line being shown in course of composition. Fig. 9 is a similar view showing the line of dies transferred to the impression mechanism. Fig. 10 is a vertical cross-section on the line 10 10 of the preceding figure. Fig. 11 is a perspective view of one of the type-dies. Fig. 12 is a perspective view of one of the spacing devices which may be used, but which forms no part of the present invention. Fig. 13 is a horizontal cross-section of the same. Fig. 14 is a perspective view of one of the matrices produced by the machine. Fig. 15 is a view of a linotype or slug, the product of the machine. Figs. 16 to 23 are detail views of the cams and their connections for imparting motion to the various operative parts. Figs. 24 and 25 are enlarged views of the parts shown in Figs. 6 and 7, but taken in a plane to show in full lines the detent for the slug and varying slightly the proportions of the parts to follow more closely those of operative mechanism actually constructed and used to demonstrate the working thereof. Fig. 26 is a view similar to a portion of Fig. 3, but on an enlarged scale, and showing the parts more exactly in accord with Figs. 6 and 7 as to the position of the dies and the locking or compressing device.

In constructing my machine I provide a series of type dies or punches A, such as shown in Fig. 11, and a series of spacing devices, such as shown at B, Figs. 12 and 13, or other suitable spaces such as are now known in the art, the special construction of these spaces forming no part of the present invention. Each die consists of a flat plate of metal having the die, type, or character proper $a$ projected from one edge. It is provided in the upper end with a notch or indentation having a series of teeth for the purpose of distribution, the arrangement and action of these teeth being the same as in the Mergenthaler machine and as described in detail in Letters Patent No. 347,629, dated August 17, 1886.

My machine will be provided with dies representing all the characters required to appear in print and a number of dies of each character.

The spacing device in the form shown consists of a plate or body $b$, having the same marginal form as the dies and provided in its upper end with distributing-teeth to admit of its being handled by the machine in the same manner that the dies are handled. On its side the body-plate $b$ is provided with a spring-plate $b'$, secured at the middle by rivets $b^2$ and having its edges sprung or bent outward away from the body-plate and then bent sharply backward across the edges of the body, as shown in Figs. 12 and 13. The two parts thus formed and united constitute a compressible space. When these yielding spaces are employed, the line may be set to a predetermined length, either by crowding the spaces into the line during the course of composition or by introducing the spaces at suitable points and composing the line to an excessive length and thereafter compressing it endwise to the required limit. The edges of the side plate overlapping the body close the joint between them, so that although the space may vary in thickness the metal is prevented from entering between the two parts, the action in this regard being essentially the same as in the compressible space shown in Letters Patent issued to me on the 6th day of January, 1891, No. 444,337.

In constructing my machine I mount on suitable framework an inclined channeled magazine C and introduce therein the dies and spaces. I provide this magazine at the lower end with escapements connected through intermediate mechanism of any characters with finger-keys D, representing the various characters and the spaces, so that the action of the finger-keys will cause the delivery of the dies representing the required characters and the spaces from the mouth of the magazine through the vertical channels E to an inclined traveling belt F, whereby they are carried downward in front of a rotary wheel G, by which they are crowded one after another into the channeled assembler-block H, wherein they are composed or assembled in line side by side.

For the purpose of holding the line of dies and spaces in compact order during the course of composition and while being transferred to the impression or indenting point I provide a horizontally-yielding resistant I in the form of a sliding bar, having at one end an upturned finger, against which the matrix-line is advanced, and having at the opposite end a connecting-spring $i$, Fig. 2, by which the resistant is urged constantly to the right. During the movement of the resistant step by step to the left under the influence of the growing line it is held by a friction-clamp $i'$.

All of the composing mechanism to this point may be identical with that used in the Mergenthaler machine, and need not, therefore, be described herein.

After the completion of the line it is necessary that it shall be shifted to the left to the indenting or impression devices. This is effected by mounting on the horizontal bar I a sliding jaw J, having on its left a yielding spring-supported face $j$. The jaw J is actuated by a pin on its side entering a slot in an upright vibratory lever $j'$. (Shown in Figs. 2, 8, 9, 10, and 16.) This line-shifting lever $j$ is carried at its lower end, as shown in Fig. 16, on a rock-shaft $j^3$, having an arm $j^4$, with a roller bearing against the side face of a cam $j^5$, mounted on the main shaft W. The rock-shaft also has a second arm connected to a tension-spring $j^6$. The spring acts through the intermediate parts to throw the lever to the left, and thereby to transfer the composed line of dies from the assembling position to the impression-point, while the cam at the proper time returns the assembler-slide to its original position, the line of dies having been in the meantime removed therefrom, as hereinafter explained. When the composition of the line is complete, the shifter-lever $j'$, swinging to the left, first advances the jaw J, causing its face $j$ to confine and compress the line of dies between it and the upturned end of the slide at the opposite end of the line. Thereafter the movement of the slide and jaw causes the line of dies to be shifted bodily to the left from the position shown in Figs. 2 and 8 to the position shown in Fig. 9. While the line is in this position, with the end of slide I abutting at its left end against the frame or other solid support, it is confined and held to the exact length desired by a vertically-movable clamping-jaw K, which descends in the rear of the end die and also behind the face $j$ of the jaw J. The clamp K consists of a body portion $k$, a laterally-sliding face $k'$, mounted therein to act against the line of dies, and an intermediate wedge $k^2$, urged upward in relation to the other parts by the intervening spring $k^3$. When the wedge is crowded between the other parts, it tends to force the face $k'$ to the left, and when the wedge is permitted to rise under the influence of the spring the face $k'$ will retreat to the right, its two positions being shown in Figs. 8 and 9. The clamp as a whole is suspended from and operated by a vertically-swinging lever $k^4$, as shown particularly in Figs. 2, 8, 9, and 10, this lever having through its end a horizontal pin $k^8$, the ends of which are seated in vertical slots $k^9$ in the ears of the body $k$. The jaw as a whole stands normally in an elevated position, as shown in Fig. 8, so that the line of dies may pass beneath it to the position shown in Fig. 9. After the line of dies is in position the jaw K descends until its body portion $k$ is brought to rest by contact with the frame, as in Fig. 10, after which the wedge $k^2$ continues its downward movement under the influence of lever $k^4$, thereby forcing the face $k'$ slightly to the left and maintaining the proper compression of the line. During this final compression, which is very slight and just sufficient to hold the dies in close contact, the jaw K is supported at the right by bearing against the end of the rib and shoulder of the assembler-block, as shown in Figs. 8, 9, and 26. When the lever $k^4$ in rising again releases the wedge $k^2$, it will be pushed upward by the spring $k^3$, and the face or jaw $k'$ will be receded slightly to the right from the position shown in Fig. 8 by the expansion of the line due to relief of the spring-spaces therein from compression and their tendency to elongate the line. The jaw may, however, be retracted in any other convenient way. When the pin in the end of the lever reaches the upper end of the slots $k^9$, the clamp as a whole will be lifted above the level of the dies, still being held and guided, however, at its lower end in the sides of the frame, which is extended above the level of the dies, as shown in Fig. 10.

The jaw-operating lever $k^4$ is operated, as shown in Fig. 17, by a link extending from its rear end to a lever $k^5$, pivoted at one end to the main frame and carrying at the other end a roller acted upon by a depressing-cam $k^6$ on the main shaft W. A spring $k^{10}$, seated beneath the lever $k^5$, tends to urge it upward in opposition to the action of the cam.

Behind the line of dies, when transferred and confined as above described, the frame is constructed, as shown in Figs. 6 and 7, to sustain a horizontal impression-slide N and to sustain the matrix-blank between this slide and the dies, as shown in Figs. 3 and 7, so that when the slide moves forward the blank will be driven into forcible contact with the dies and their letters or characters indented therein, thereby producing a line-matrix. (Shown in Fig. 14.)

After the impression-slide has acted it is necessary to withdraw the indented blank or matrix from the face of the dies, which are embedded therein. For this purpose I have constructed the impression slide or plunger, as shown in Figs. 3, 6, and 7, with a horizontal groove $m$, of dovetail form, in its face. When the slide advances, the metal of the blank being confined and squeezed between the dies and the slide flows backward into and fills the dovetail groove, thus causing the matrix to interlock with the slide, so that when the latter is retracted it will draw the matrix away from the dies. As the adhesion between the dies and the matrix is very slight, a shallow groove in the slide is sufficient for the purpose.

After the matrix has been formed and retracted, as above described, it is necessary that it shall be detached from the slide or plunger N and transferred to the mold. For this purpose I provide a horizontal slide P, mounted in the frame and arranged to advance horizontally against the end of the matrix M, as shown in Fig. 3, so as to push the same endwise out of the groove in the slide and forward through a guiding-groove in the frame until it assumes the proper position behind the mold Q.

In practice it is found that the friction between the matrix and the dovetailed end of the slide is so slight that the matrix may be pushed out of engagement with comparative ease and without the slightest danger of mutilating its end or impairing its utility.

The matrix-shifting slide P is actuated, as shown in Fig. 19, by a lever $p$, mounted at its lower end on a rock-shaft $p'$. This rock-shaft has an arm $p^2$, with a roller bearing against the side face of the cam $p^3$ on the main shaft, and also has a second arm $p^4$, drawn downward by a tension-spring $p^5$, so that the lever and slide are moved positively in one direction by the cam and in the opposite direction by the spring.

The matrix-blank may obviously be introduced between the dies A and the impression-slide N in any suitable manner. In order, however, to secure an automatic feeding of the blanks, I propose to employ in connection with the impression-slide a suitable magazine or holder in which the blanks will be placed and from which they will descend one at a time in front of the slide when it is withdrawn.

Many magazines suitable for the purpose and operating in connection with a horizontal slide are known in the art in connection with type-setting machines, coining-presses, vending-machines, and other mechanisms, and for this reason the special construction of the automatic feeding mechanism herein shown is not of the essence of my invention. Mechanism of this general character designed to deliver slugs laterally from a magazine or holder into the path of the slide by which the slugs are moved forward to and forced against indenting-dies one slug at a time is shown and described in Letters Patent of the United States, No. 442,551, to St. John, dated December 9, 1890.

As shown in the drawings, the feed mechanism consists of an inclined magazine or holder L, in which the matrix-blanks M are placed one above another, so that they tend to descend to the lower end by gravity. A spring-actuated follower may be arranged behind them, as shown in Fig. 6. The arrangement and proportion of the parts are to be such that when the slide is retracted from the dies a single blank may fall from the lower end of the magazine into the space in front of the slide and between it and the dies, so that when the slide again advances it will carry the blank which is standing before it forward against the dies.

In order to prevent the feeding of more than one blank at a time and to prevent the blanks from interfering with each other, I provide an escapement or detaining device $l$, located under the mouth of the magazine and mounted at its upper end on a horizontal pivot. The upper surface of the slide N is provided with a cam-surface to act on the lower end of the escapement and lift the same toward the magazine and blanks as the slide is retracted. This escapement and the cam for actuating it are so formed and proportioned that when the slide moves forward, carrying a blank before it, the detent will be released or permitted to descend sufficiently to admit of the column of blanks feeding downward in the magazine toward the slide until the foremost blank is in position to fall in front of the slide, when the latter is retracted. The form and arrangement are such also that when the slide is retracted the detent or escapement will rise and engage the second blank in the magazine and hold it and the column above it upward and backward, while leaving the lowermost blank free to fall in front of the slide when it has retracted a sufficient distance. This mechanism, which is indicated by dotted lines in Figs. 6 and 7, is more plainly shown by full lines in Figs. 24 and 25, which latter figures are made upon a larger scale than Figs. 6 and 7 and follow somewhat closely the lines of a working apparatus made and successfully operated to feed the blanks to indenting mechanism such as here set forth. In its general construction and mode of operation the detent is quite similar to one of several forms set forth in Letters Patent of the United States granted to Rosenborg September 9, 1843, No. 3,257.

The sectional form of the blanks is not of the essence of my invention, as leaden blanks of various shapes are already known in the art in connection with matrix-machines; but I have here represented a blank having the forward edges beveled or cut away. If the blanks be of other form or proportion than here shown, the feed devices will of course be made to correspond, these matters of form and proportion being within the ordinary range of mechanical skill.

The impression-slide N may be operated either by a toggle-lever $n$, as shown in Figs. 1, 6, 7, and 18, or in any other suitable manner. As shown in the drawings, the toggle $n$ is connected at the middle by a rod $n'$ to a lever $n^2$, pivoted at one end to the frame and carrying at the opposite end a roller acted upon by a depressing-cam $n^3$, mounted on the main shaft W. A spring $n^6$, acting beneath the lever, tends to raise the same and retract the impression-slide, while the cam, acting at the proper time, effects the positive advance of the slide.

After the impression has been made in the matrix-blank it is necessary to return the dies A to the magazine C, from which they were originally delivered. This distribution is effected by the usual distributer-bar at the top of the magazine and by a vertically-swinging arm O, carrying at its outer end a hinged horizontally-ribbed bar $o$, Figs. 1, 6, 7, 8, 9, and 20, adapted to engage the distributer-teeth in the upper ends of the dies or spaces.

Previous to the transfer of the matrix-line to the impression-point the bar $o$ is lowered, as shown in Figs. 6, 7, 8, and 20, to such position that when the line is shifted horizontally from the assembling position to the impression-point the teeth of the dies will engage the bar $o$. After the impression the arm O is swung upward, carrying the matrices and spaces to the distributing mechanism at the top of the magazine.

The lifting devices, the devices for transferring the dies and spaces to the distributer-bar, and the entire distributing mechanism may be of the same construction as the distributing devices and attendant parts in the Mergenthaler machine, hereinbefore referred to. As they constitute in themselves no part of the present invention and as they are well known to all persons skilled in the art, a detailed description is deemed unnecessary herein.

Reference has already been made to the fact that after the matrix is indented and retracted it is shifted endwise by the slide P out of engagement with the impression-slide N and through a guide-channel in the frame to a position behind the mold. The relation of the parts at this time is clearly shown in Figs. 3, 4, and 5, in which Q represents the mold, consisting of a metallic block having therethrough from the front to the rear a slot or mold proper of the exact size of the required linotype or slug. It is the office of the matrix M to temporarily close the rear side of this mold and to form the type characters on the rear edge of the linotype cast in the mold.

The mold is mounted in a vertically-movable slide R in such a manner as to have a slight forward-and-backward motion therethrough, and this in order that it may be crowded tightly against the matrix during the casting action, as shown in Figs. 3 and 4, and thereafter moved forward away from the matrix in order to withdraw the type characters of the contained linotype therefrom.

The mold when in the casting position communicates at its forward side with and is temporarily closed by the delivery-mouth of a melting-pot S, heated by a gas-flame thereunder and provided with a pump-plunger $s$, by which the molten type-metal is delivered at proper times through the mouth of the pot into the mold and against the matrix covering its rear face, as shown in Fig. 4, the result being the production within the mold of a linotype bearing on its edge in relief the characters contained in the matrix.

Figure 21:
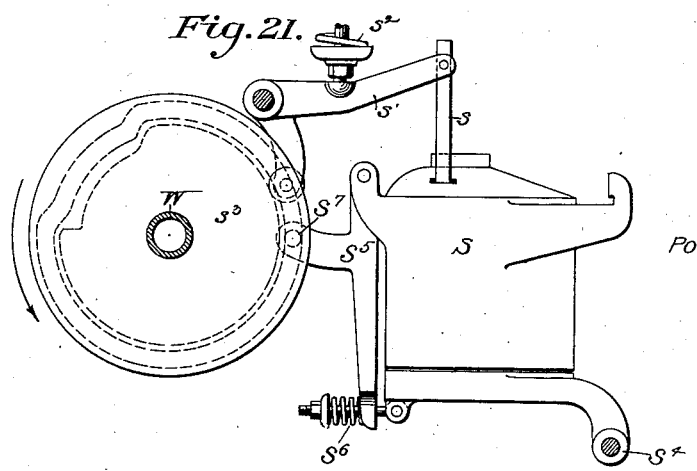
Figure 22:
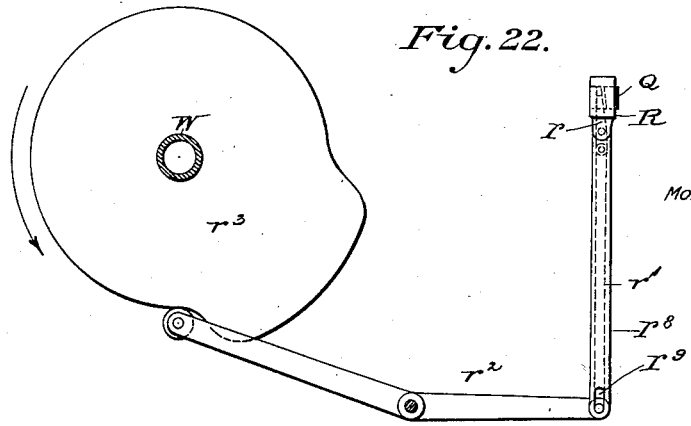

The general construction of the pot, the pump, and the burner is the same as in the Mergenthaler linotype-machine. The mouth of the pot, however, differs from that in the Mergenthaler machine in that it is extended from the rear beneath the mold and returned against the front face of the mold, as shown in Figs. 1, 4, and 21. The pot is mounted, as usual, on a horizontal shaft $s^4$, under its lower end, and is caused to swing forward and backward, as shown in Figs. 1 and 21, by a cam $s^3$, mounted on the main shaft and having in its side a cam-groove engaging a stud $s^7$ on the side of the lever $s^5$, which latter is pivoted at its upper end to the rear side of the pot and arranged to act at its lower end against a rear spring $s^6$, mounted on a bolt extending from the lower part of the pot. As the cam revolves it acts at the proper time to pull the lever $s^5$ backward, and the lever in turn acts through its pivot and the spring $s^6$ to draw the pot backward with a strong but yielding pressure. In this manner the mouth of the pot is crowded backward against the mold and the latter in turn crowded backward against the matrix M, so that a close joint is maintained both at the front and the rear of the mold to prevent the leakage of the molten metal. After the casting action the continued rotation of the cam $s^3$ swings the pot forward, thereby relieving the mold from pressure, so that it may be moved forward away from the matrix, as before referred to. The retraction of the mold is effected in the manner clearly shown in Figs. 1, 3, 4, 5, and 22 by means of vertically-movable bars $r'$, the upper ends $r$ of which are tapered and seated between shoulders on the ends of the mold and opposing shoulders in the frame R, as particularly shown in Fig. 3, so that when these tapered ends or wedges are forced upward in relation to the mold and the frame R they crowd the mold back to the front and away from the matrix, the two positions of the mold being plainly shown in Figs. 4 and 5, which latter, however, shows the mold raised to the ejecting plane for removal of the slug. In Fig. 5 the parts are shown in the positions they occupy when the wedges are drawn down in advance of the other parts, this relative movement simply reversing the described action of the rods $r'$ and $r^8$. In Fig. 22 the mold is shown in its lower position, and the wedges are shown down, as in Fig. 5. After the mold has been retracted and while it contains the linotype it is lifted bodily by the elevation of the frame R from the casting position (shown in Fig 4) to the discharging position. (Shown in Fig. 5.) This brings the linotype directly opposite a horizontally-guided ejector-blade T, which, advancing at the proper time, pushes the slug out of the mold, essentially as in the Mergenthaler machine, onto a receiving-plate U at the rear, after which the ejector is withdrawn and the mold is lowered and again carried rearward by the pot into contact with the next matrix presented behind it. The vertical movements of the mold-carrying frame R and the movement of the wedges for retracting the mold horizontally are effected by the means shown in Figs. 1, 4, 5, and 22.

The wedge-bars $r'$ are jointed, as shown in Figs. 1 and 22, at their lower ends to a lever $r^2$, pivoted midway of its length and having at its rear end a roller bearing against the surface of a cam $r^3$ on the main shaft, the action of this cam serving to lift the forward end of the lever and raise the wedge-bars, so that they will retract the mold. The descent of the bars is insured as the cam relieves the lever by a spring $r^4$, Fig. 1, drawing downward on the forward end of the lever.

The mold-carrying slide has jointed to it downwardly-extending bars $r^8$, the lower ends of which are slotted at $r^9$ and mounted on a pin in the forward end of the wedge-operating lever $r^2$, so that the lever is allowed a limited vertical motion in relation to the bars. When the mold is down in casting position, the parts stand as in Figs. 1 and 22, the wedges being lowered and the pin in the operating-lever standing in the lower ends of the slotted bars. When the end of the lever is raised, the first action is to lift the wedges in relation to the other parts, thereby retracting the mold. After this has been effected the lever-pin reaches the upper ends of the slots $r^9$, whereupon the lever acts to lift the bars $r^8$ and thereby the mold-supporting frame R to its upper position. When the lever descends, the mold-frame is lowered and the wedges lowered in relation to the frame and mold. It will be perceived that the advantage of the slot and lost motion lies in the fact that it enables one lever to operate the devices for raising and lowering the mold as well as the devices for effecting its retraction.

Figure 23:
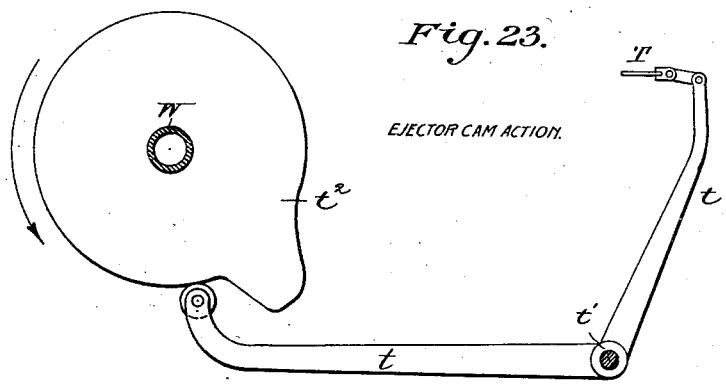

The ejector-blade T is mounted in fixed guides $t^5$ and connected by links to the upper end of an operating-lever $t$, which latter, as shown in Figs. 1 and 23, is of angular form, being pivoted to the main frame at $t'$ and extended rearward beneath a cam $t^2$ on the main shaft W. A lifting-spring $t^3$ (shown in Fig. 1) tends to lift the rear end of the lever and retract the ejector, while the cam, acting in the opposite direction, moves it positively forward to effect the dislodgement of the linotype.

The arm O, by which the line of dies is lifted to the distributer, is operated as shown in Figs. 1 and 20, being secured to a rock-shaft $o^2$, having a second arm $o^3$, which is acted upon by a lifting-cam $o^4$ on the main shaft W, this arrangement being the same as that employed in the Mergenthaler machine. After the matrices are raised by the arm O to the level of the distributer they are shifted horizontally into the same by the slide on the upper end of lever X, which is also operated by a cam on the main shaft, this arrangement being identical with that in the Mergenthaler machine.

The receiving-plate U, on which the linotypes are received from the mold, is hinged at one end, so that it may be turned up past the vertical position in order to deliver the linotypes one after another into the galley V and assemble them therein, as clearly shown in Fig. 2. This vibration of the plate U is effected, as shown in Figs. 1 and 2, by its crank-arm, connected by a rod $u$ with the crank $u'$ on a horizontal rock-shaft $u^2$, seated in bearings at one end of the frame and provided at its rear end with an arm $u^3$, bearing against an actuating-cam $u^4$ on the main shaft.

The pump-plunger $s$ for delivering the molten metal from the pot is operated by a lever $s'$, pivoted in the main frame and bearing at its rear end on an elevating-cam on the main shaft, the depression of the lever when released by the cam being effected by an overlying spring $s^2$, this arrangement being the same as that in the Mergenthaler machine.

The operation of the machine is as follows: The operator depresses the finger-keys representing the required characters and spaces in proper sequence. The dies and spaces falling from the magazine to the belt F descend one after another to the assembling-block H, in which the line is composed, between the upturned end of the resistance I and the sliding jaw J. When the line reaches a suitable length, the main shaft is thrown into action, as in the ordinary Mergenthaler machine, and the lever j' moves the line bodily to a position opposite the impression-slide N, where the dies are solidly supported, as shown in Figs. 3, 6, and 7. While the dies are in this position, a matrix-blank is delivered in front of them and sustained by the frame or support. The slide N then advances and presses the matrix-blank against the line of dies, thus effecting at one operation the line-impression and completing the matrix. The impression-slide N then retracts, withdrawing the matrix, which is interlocked therewith, from the dies. The slide P shifts the matrix endwise out of engagement with the impression-slide through the intermediate guiding and supporting channel in the frame to its operative position behind the mold at or about the same time that the preceding line of dies, having finished its work, is lifted by the arm O to the distributer-bar. The mold being down at the casting-level and the mold-retracting wedges being also down, the cam acts to draw the pot rearward, and the mouth of the pot pressing tightly against the face of the mold forces it backward into intimate contact with the face of leaden matrix, with which it forms a close joint. If desired, the mold may be constructed as usual, as fully described in the Lee and Le Brun patent, with a knife-edge around its opening to enter the matrix and insure the closing of the joint. The application of this feature in the present machine is not claimed as an invention. While the mold is tightly clamped between the matrix on one side and the mouth of the pot on the other, the pump s acts and the molten metal is delivered into the mold to form the linotype. The pot then retreats from the mold, the wedges ascend to withdraw the mold, the frame R rises with the mold, and the ejector T delivers the slug to the receiver U, which turns it over in position in the galley.

The groove in which the matrix is supported and guided behind the mold is of suitable size and shape to hold the edges of the matrix with that slight friction which is necessary to keep it in the position to which it is carried by shifter P, and also to prevent it following the slug when the latter is retracted with the mold.

As one matrix is pushed endwise into position behind the mold it drives out the preceding matrix from the open end of the channel. (Clearly shown in Fig. 3.)

It is to be observed that my machine in its general organization possesses the following characteristics:

It is the first indenting-machine in which male dies have been arranged to circulate—that is, to leave the magazine at one point and enter it at another—so that while one line of dies is being composed another line or lines may be in course of progress through the machine, thus avoiding the necessity of effecting the distribution of one line before the composition of another can be commenced.

It is the first machine in which male dies have been delivered from a magazine composed in line at one point and the composed lines transferred to another point, there to cooperate with an indenting or impression mechanism.

It is the first machine in which the composed line of dies being transferred to the impression-point directly engages the device for lifting the line to the distributer, so that the line may be lifted directly from the impression-point to the distributer.

It is the first machine in which dies have been combined with a composing mechanism, an indenting mechanism, an independent distributing mechanism, and a casting mechanism to coöperate with the matrices produced by the indenting mechanism.

The subject-matter of the third recital of characteristic features of this invention—to wit, the direct engagement of the composed line of dies being transferred to the impression-point with the device for lifting the line to the distributer, so that the line may be lifted directly from the impression-point to the distributer—is not claimed herein.

Having thus described my invention, what I claim is—

1. In a linotype-machine, the combination of the following elements: a series of circulating type dies and spaces, a composing mechanism for selecting and assembling the dies and spaces in line, an impression mechanism for producing a matrix from the composed line, a casting mechanism to produce a linotype against the matrix, and a mechanism distinct from the composing devices for distributing the dies.

2. In a linotype-machine, the combination of the following elements: a series of male type dies and spaces, a composing mechanism therefor, a separate distributing mechanism for the dies, and an impression mechanism comprising means to support a matrix-blank and a pressure device to force the same against the composed dies.

3. In a linotype-machine, the combination of the following elements: a series of male type dies and spaces, a composing mechanism therefor, a separate distributing mechanism for the dies, an impression mechanism comprising means to support a matrix-blank and a pressure device to force the same against the composed dies, and automatic mechanism for feeding the blanks successively to the impression mechanism.

4. In a linotype-machine, the combination of the following elements: a series of male type dies and spaces, a composing mechanism therefor, a separate distributing mechanism for the dies, an impression mechanism comprising means to support a matrix-blank and a pressure device to force the same against the composed dies, automatic mechanism for feeding the blanks successively to the impression mechanism, and a casting mechanism coöperating with the matrix to produce a linotype therefrom.

5. In a linotype-machine, the combination of a series of circulating type-dies, a series of compressible spaces, mechanism for selecting and composing the dies and spaces in lines, mechanism for compressing each line to a predetermined length, means for supporting a matrix-blank in front of said dies, and means for forcing said blank against the dies to effect their impression in the blank.

6. In a linotype-machine, the combination of a series of circulating type dies and spaces, a composing mechanism comprising a magazine, finger-key connections for releasing the dies and spaces and means for assembling them in line, means for transferring the composed line to the impression-point, means for supporting a matrix-blank in front of the composed line, an impression device acting to force the blank into contact with the composed line, mechanism for transferring the matrix from the impression-point, a casting mechanism comprising a melting-pot and mold to coöperate with the transferred matrix, and a distinct mechanism for distributing the dies.

7. In a linotype-machine, the combination of the line of male dies and means for supporting a matrix-blank in front thereof, and the impression-slide provided with an undercut groove in its face, whereby the impression is caused to interlock the matrix with the slide, so that it will be withdrawn thereby from the dies.

8. In a linotype-machine and in combination with the dies and the grooved slide N, to effect the impression and withdrawal of the matrix-blank, the slide P to effect the disengagement of the matrix from the slide and its transfer to the casting-point.

9. In a linotype-machine, the combination of a line of dies, an opposing impression-slide, an overlying magazine for the matrix-blanks, and a detent, operated by the slide substantially as described, whereby the blanks are released and permitted to fall one at a time between the slide and dies.

10. The combination, in an organized machine for producing type-bars or linotypes from impressed line-matrices, of a magazine having separate cells for circulating type-dies, a holder having a line-assembling channel or space, mechanism for individually releasing the circulating type-dies from the magazine, a holder for matrix material, means for causing the line of type-dies to indent the matrix material to form a line-matrix, casting mechanism to produce a type-bar from the said matrix, and distributing mechanism for removing the type-dies from their channel and returning them to their proper cells in the magazine.

11. In a linotype-machine, a series of circulating type-dies, independent mechanism for composing the said dies in lines and for effecting their redistribution, and means for supporting a single matrix-blank in front of the dies and causing the dies to indent the same.

In testimony whereof I hereunto set my hand, this 18th day of May, 1893, in the presence of two attesting witnesses.

PHILIP T. DODGE.

Witnesses:
 FREDK. J. WARBURTON,
 ARTIS H. EHRMAN.